UNITED STATES PATENT OFFICE 2,472,574

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 11, 1948, Serial No. 14,398

5 Claims. (Cl. 252—340)

This invention relates to processes or procedures for preventing, breaking, or resolving emulsions of the water-in-oil type, and has for its main object to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Still another object of our invention is to provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in the absence of such precautionary measure. Similarly, such demulsifier may be mixed with the hydrocarbon component.

The new chemical compounds that are used as the demulsifying agent of our process, are obtained by a succession of three steps:

(a) Oiticica oil is mixed with raw castor oil and subjected to heating in the presence of an acid catalyst. This particular step results in a series of reactions which may be indicated briefly as follows: (1) Dehydration of castor oil; (2) isomerization of the dehydrated castor oil; (3) co-polymerization of the dehydrated or dehydrated isomerized castor oil with the oiticica oil;

(b) Such product is blown so as to increase the viscosity substantially, but in any event, so as to stay below the gellation point; and (c) Such bodied or blown vegetable oil product is then subjected to oxyalkylation, particularly oxyethylation, so as to give it distinctly hydrophile properties.

In order that the invention may be completely understood, we will describe the successive steps, although it is understood that the preparation of the intermediate prior to oxidation or air-blowing is well known and has been described elsewhere. See U. S. Patent No. 2,318,304, dated May 4, 1943, to Gardner.

The conventional dehydration of castor oil or ricinoleic acid, or some other ester, results in the formation of a diene acid, with the probability that two reactions ordinarily go to approximately the same degree. These reactions may be illustrated in the following manner:

*Reaction 1*

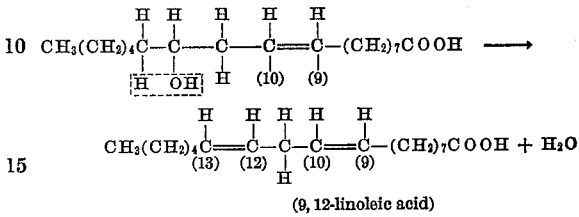

(9, 12-linoleic acid)

*Reaction 2*

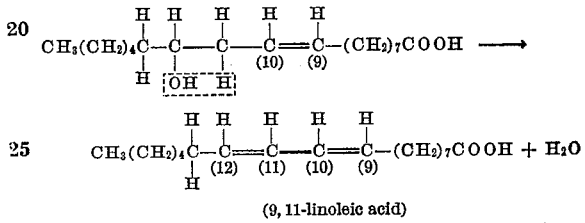

(9, 11-linoleic acid)

United States patents which illustrate this procedure, are the following: No. 2,140,271, dated Dec. 13, 1938, Schwarcman; No. 2,195,225, dated Mar. 26, 1940, Priester; No. 2,209,065, dated July 23, 1940, Pelikan; No. 2,212,385, dated Aug. 30, 1940, Brod; No. 2,226,830, dated Dec. 31, 1940, Priester; No. 2,226,831, dated Dec. 31, 1940, Priester; 2,261,663, dated Nov. 4, 1941, Rheineck; No. 2,336,186, Dec. 7, 1940, Nessler; No. 2,351,444, June 13, 1944, Miller, and No. 2,246,768, June 24, 1941, Ubben.

The mixed isomers may be treated so as to convert the unconjugated isomer into the conjugated isomer. This isomerization reaction may be indicated thus:

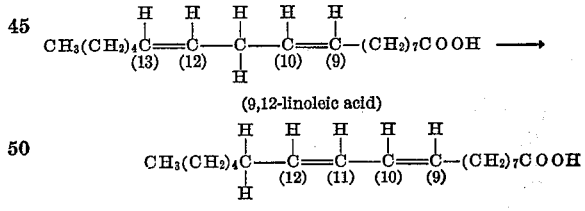

U. S. patents exemplifying isomerization procedure of the kind indicated are the following:

No. 2,185,414, dated Jan. 2, 1940, McKinney; No. 2,242,230, dated May 20, 1941, Burr, and No. 2,350,583, dated June 6, 1944, Bradley.

As is well known, oiticica oil consists essentially of the glyceride of licanic acid. This is the only known naturally-occurring fatty acid which contains a keto group. In addition to the keto group attached to the fourth carbon atom, it contains three conjugated double bonds in the same position as in eleostearic acid. Insofar that oiticica oil alone polymerizes in the presence of an acid catalyst and so does dehydrated castor oil, it is purely a matter of speculation as to the nature of the complex co-polymers obtained in the manner previously described.

OITICICA OIL-CASTOR OIL CONDENSATE
Example 1

500 parts, by weight, of raw castor oil and 500 parts, by weight, of raw oiticica oil were placed in a vessel, and there was added 2 to 10 parts, by weight, of an acid substance such as sodium acid sulfate (NaHSO$_4$) as activating agent. The mixture was progressively heated. At 100° C. some indication of moisture evolution was indicated, but at approximately 150° C. there was a violent ebullition, and water was expelled. Apparently at this point of the reaction a combination occurred between the nascently dehydroxylated castor oil and the dehydrated oiticica oil. By continuing the reaction up to about 250° C., water was expelled to the amount of about 25 parts, by weight, or more. At a temperature of about 280° C., the reaction apparently was complete, no more water being given off. At this point the composition had become very viscous, apparently due to the reaction between the two oils.

OITICICA OIL-CASTOR OIL CONDENSATE
Example 2

1000 parts, by weight, of raw castor oil was treated with from 2 to 10 parts, by weight, of an acidic substance such as sodium acid sulfate. The process of dehydroxylation was carried on, with progressive heating, until a temperature of approximately 250° C. was reached, at which point there had been distilled off approximately 4% of water. 1000 parts, by weight, of oiticica oil was then introduced, the temperature dropping to about 150° C. The temperature of the mixture was then gradually brought up to 280° C., during which interval there was a further evolution of water—usually in the neighborhood of 2%. Apparently intense reactions occurred during this period, as the composition became very viscous. It is believed that a condensation between the dehydroxylated molecule of the castor oil and the ketonic group of the oiticica oil occurred. At a temperature of 280° C. the reaction apparently was complete, and the composition was allowed to cool.

OITICICA OIL-CASTOR OIL CONDENSATE
Example 3

500 grams of raw oiticica oil and 500 grams of commercial castor oil were placed in a flask along with 10 grams of sodium acid sulfate crystals, (NaHSO$_4$.H$_2$O). The mixture was stirred, using a condenser and conventional trap. Using this particular procedure, there was no violent evolution of water and the first noticeable amount of water which came over was at approximately 180° C. Reaction temperature was allowed to rise at 250° C. The total amount of water which came over was approximately 16.5 grams, or slightly more, but in any event, less than the expected amount of 25 grams. There was also obtained about 3 to 4 grams of an oily substance. The resultant product was a deep amber colored viscous oil.

OITICICA OIL-CASTOR OIL CONDENSATE
Example 4

The same procedure was followed as in the preceding example, except that fused sodium acid sulfate was employed (NaHSO$_4$). The amount employed was 5 grams. In this instance, water did not start to come off until 200° C. was reached. The temperature was allowed to rise to 280° C. when heating was stopped. The total amount of water obtained in this instance was 12 grams and the amount of oil obtained was 8 grams.

As stated in the aforementioned U. S. Patent No. 2,318,304, dated May 4, 1943, to Gardner, the course of the reaction involved in the above examples is not substantially altered by the substitution of another acid sulfate, e. g., potassium acid sulfate, for the catalytically-acting sodium acid sulfate, the —HSO$_4$ group being the activating agent.

Attention is directed to the fact that one can dehydrate the castor oil separately and then mix such dehydrated castor oil with oiticica oil and produce the ultimate condensate in the presence of the same acid catalyst used for the dehydration of castor oil, or with a further addition of catalyst. For convenience, however, we prefer to proceed in the manner exemplified in the condensate Examples 1, 3, and 4, rather than in the manner exemplified by Example 2.

In the examples which have appeared immediately preceding in the text, the ratio of the two oils, oiticica on the one hand, and either castor oil or dehydrated castor oil on the other hand, is in equal amounts by weight. However, if desired, for each 100 parts, by weight, of oiticica oil, one may use from 50 to 250 parts, by weight, of castor oil or dehydrated castor oil.

Having obtained a condensate or co-polymer in the manner described and exemplified by the previous examples, the next step is subjecting such a product to blowing or oxidation with a gaseous medium in the manner commonly employed in blowing castor oil or dehydrated castor oil.

It is well known that oxidized oils can be obtained from castor oil, ricinoleic acid and various derivatives of ricinoleic acid, such as monoricinolein, diricinolein, and polyricinoleic acids. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc.; or it may be of the organic type which produces peroxide, such as alpha-pinene, linseed oil, etc. Oxidation may take place at atmospheric pressure or superatmospheric pressure, i. e., pressures up to or including 200 pounds gauge pressure, and at any temperature slightly above the boiling point of water, for instance, 120° C. up to any temperature which does not produce undue decomposition by pyrolytic reaction.

The time of blowing may be fairly brief, for example, 8-10 hours; or it may be quite extensive, for instance, as long as 10-12-14 days, the longer time periods being employed generally when the temperature is just slightly above the boiling point of water, and when oxidation is with air at atmospheric pressure.

One method of preparing drastically-oxidized castor oil is described in U. S. Patent No. 2,023,979, dated Dec. 10, 1935, to Stehr. Also see U. S. Patent No. 2,183,487, dated Dec. 12, 1939, to Colbeth.

Thus, the same conventional procedure or procedures employed for oxidation of castor oil or similar compounds, is equally suitable for the blowing or oxidation of oiticica oil-castor oil condensate or polymer, as previously described. In most instances, the period of oxidation may be somewhat longer, although it is also possible to obtain satisfactory products, in which the period of oxidation is somewhat reduced in comparison with the oxidation of castor oil or triricinolein under the same conditions. The application of oxidation is so similar to or identical with that of castor oil, that any differences of manipulation which may be required are perfectly apparent in the ordinary conduct of the process. For instance, if one attempts to oxidize oiticica oil-castor oil condensate or polymer, as herein described, to obtain the same viscosity as an oxidized castor oil, and if at the end of the predetermined period, the viscosity or other index indicates under-oxidation, naturally, the process is continued until the same or a comparable degree of oxidation is obtained. Similarly, in the conventional blowing of castor oil, the last stage of oxidation is somewhat critical and sometimes the period of blowing must be shortened. If, during the oxidation of hydroxyacetylated castor oil, there happens to be an increased or intensive period of reaction, obviously only the ordinary precautions need be taken to prevent over-oxidation. The degree of oxidation can be measured, or at least approximated, by the percentage reduction in iodine value, simultaneously with the increase in viscosity.

OXIDIZED OITICICA OIL-CASTOR OIL CONDENSATE

*Example 1*

The 1000 gram sample obtained in the manner described under the heading "Oiticica oil-castor oil condensate" was subjected to air blowing in the following manner: The temperature was held constant at 110° C. Air was passed through in a slow stream until the product became very viscous. This required 126 hours. The product, prior to this treatment, was a dark, viscous, amber-colored oil, and after this treatment had even a deeper amber color and was even more viscous. The viscosity was so high it became apparent that any further oxidation would lead to incipient gellation.

OXIDIZED OITICICA OIL-CASTOR OIL CONDENSATE

*Example 2*

The same procedure was repeated as in the preceding example, except that the condensate subjected to oxidation was the one described under the heading "Oiticica oil-castor oil condensate, Example 4" instead of the one employed in the previous example, to wit, "Oiticica oil-castor oil condensate, Example 3". The temperature and the time required were identical as in the preceding example, and air was passed through in a slow stream. The appearance of the final product was substantially the same as the appearance of the product in the example immediately preceding.

Having obtained the oxidized oiticica oil-castor oil condensate in the manner exemplified by the two preceding examples, the next step is to subject such a product to oxyalkylation with an alkylene oxide. Suitable alkylene oxides include ethylene oxide, propylene oxide, butylene oxide, glycide, and methyl glycide.

OXYALKYLATED OXIDIZED OITICICA OIL-CASTOR OIL CONDENSATE

*Example 1*

The 1000 gram sample of oxidized oiticica oil-castor oil condensate described under the heading "Oxidized oiticica oil-castor oil condensate, Example 1," was mixed with 18 grams of sodium methylate and placed in an autoclave equipped with a stirring device and a heating device. 400 grams of ethylene oxide was added and the product stirred for ten hours. It will be noted that a small amount of the sodium methylate was used up in neutralizing the acid catalyst which remained as a result of the condensate reaction, but the bulk of the sodium methylate was present as a catalyst to accelerate the reaction with the alkylene oxide. During the first stage of oxyalkylation, the time required was approximately four hours. The temperature during this period was 150 to 160° C. The maximum gauge pressure was approximately 170 pounds per square inch. At the end of the first addition of ethylene oxide, the product was somewhat reduced in viscosity, there was a slight decrease in color, and the product showed a tendency to emulsify in the water.

A second addition of ethylene oxide was made in the same amount as before, to wit, 400 grams. The time, temperature, and pressure were substantially identical, as with the initial addition. The product obtained was less viscous than before, lighter in color, and emulsified readily and showed a distinct tendency towards solubility.

A third addition of ethylene oxide was made the same as before. The amount added was 400 grams. The time, temperature, and maximum pressure during oxyalkylation was substantially the same as in the preceding two stages. The final product obtained was a non-viscous liquid, much lighter in color than the original sample and very readily water-soluble. It was to be noted that this material contained no diluent.

OXYALKYLATED OXIDIZED OITICICA OIL-CASTOR OIL CONDENSATE

*Example 2*

Identically the same procedure was followed as in "Oxyalkylated oxidized oiticica oil-castor oil condensate," Example 1," preceding, except that the oxidized condensate employed was the one described under the heading "Oxidized oiticica oil-castor oil condensate, Example 2." In all other respects and in the amount of catalyst employed, the amount of ethylene oxide employed time, temperature and pressure, etc., the operating procedure was the same as in the preceding example. The appearance of the product was the same as in the preceding example.

OXYALKYLATED OXIDIZED OITICICA OIL-CASTOR OIL CONDENSATE

*Example 3*

The same procedure was followed as in the two preceding examples, except that the oxidized oiticica oil-castor oil condensate were treated with the same weights of propylene oxide instead of ethylene oxide.

As has been previously pointed out, the alkylene oxides which may be employed include not only those mentioned in the two preceding examples, but also butylene oxide, glycide, and methyl glycide. It is also to be noted that any of the products described at the end of the first stage or second stage of alkylation in the three preceding examples, are just as satisfactory for use as when the entire amount of alkylene oxide is added. All that is required is that the addition of the alkylene oxide be sufficient to contribute distinct hydrophile properties, i. e., that the resultant obtained from the oxyalkylation stage or step mixes with water to give a suspension or is self-emulsifiable or gives a sol or clear solution. As a rule, such sols, solutions, or suspensions give a very definite and permanent foam on shaking.

The amount of alkylene oxide which may be employed is not limited to the amounts indicated, and if desired, may be two or three times the amounts of the initial oxidized condensate.

Conventional demulsifying agents employed in the treatment of oil field emulsions are used as such, or after dilution with any suitable solvent, such as water, petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process for resolving emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000 in desalting practice, such an apparent insolubility in oil and water is not signicant, because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial values, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidely feasible when the demulsifier is used in connection with acidification of calcareous oil-bearing strata, especially if suspended in or dissolved in the acid employed for acidification.

A somewhat analogous use of our demulsifying agent is the removal of a resdual mud sheath which remains after drilling a well by the rotary method. Sometimes the drilling mud contains added calcium carbonate, or the like, to render the mud susceptible to reaction with hydrochloric acid, or the like, and thus expedite its removal.

Particular mention is made in respect to the use of these products in the removal of mud sheaths, as described in U. S. Patent No. 2,135,909, dated Nov. 8, 1938, to Louis T. Monson.

Having thus described our invention, what we claim as new and desire to secure by Letters Patent is:

1. A process for breaking petroleum emulsions of the water-in-oil type, characterized by subjecting the emulsion to the action of a demulsifier including an oxyalkylated, drastically oxidized oiticica oil-castor oil condensate, said condensate being obtained by a reaction within the temperature range of 250° C. to about 280° C. in the presence of an acid sulfate activating agent; the proportion of oiticica oil to castor oil being within the range of one part of castor oil to two parts of oiticica oil, up to five parts of castor oil to two parts of oiticica oil; said oxidation being by means of a gaseous oxygen-containing medium and said oxyalkylation being sufficient to endow the final product with distinctly hydrophile properties and with the final proviso that the oxyalkylating agent be selected from the class consisting of ethylene oxide, propylene oxide, butylene oxide, glycide, and methyl glycide.

2. The process of claim 1, wherein the mixture of vegetable oils is in substantially equal amounts.

3. The process of claim 1, wherein the mixture of vegetable oils is in substantially equal amounts and the oxyalkylating agent is ethylene oxide.

4. The process of claim 1, wherein the mixture of vegetable oils is in substantially equal amounts and the oxyalkylating agent is ethylene oxide employed in an amount at least equal to the oxidized condensate.

5. The process of claim 1, wherein the mixture of vegetable oils is in substantially equal amounts and the oxyalkylating agent is ethylene oxide employed in an amount at least equal to the oxidized condensate, with the proviso that the castor oil dehydration step and condensation with the oiticica oil take place simultaneously.

MELVIN DE GROOTE.
BERNHARD KEISER.

REFERENCES CITED

The following references are of record in the file of this patent:

UNITED STATES PATENTS

| Number | Name | Date |
|---|---|---|
| 2,281,316 | Mace | Apr. 28, 1942 |
| 2,307,494 | De Groote et al. | Jan. 5, 1943 |
| 2,318,009 | Novak | May 4, 1943 |
| 2,318,304 | Gardner | May 4, 1943 |
| 2,351,018 | De Groote et al. | June 13, 1944 |
| 2,375,538 | De Groote | May 8, 1945 |
| 2,401,966 | Salathiel | June 11, 1946 |